US012647903B2

(12) United States Patent
Xu et al.

(10) Patent No.: US 12,647,903 B2
(45) Date of Patent: Jun. 2, 2026

(54) METHOD AND APPARATUS FOR POWER CONTROL

(71) Applicant: Telefonaktiebolaget LM Ericsson (publ), Stockholm (SE)

(72) Inventors: Jiying Xu, Beijing (CN); Yibo He, Beijing (CN); Pengpeng Wang, Beijing (CN); Yanda Tong, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 313 days.

(21) Appl. No.: 18/264,471

(22) PCT Filed: Mar. 1, 2021

(86) PCT No.: PCT/CN2021/078477
§ 371 (c)(1),
(2) Date: Aug. 7, 2023

(87) PCT Pub. No.: WO2022/183320
PCT Pub. Date: Sep. 9, 2022

(65) Prior Publication Data
US 2024/0049145 A1     Feb. 8, 2024

(51) Int. Cl.
*H04W 52/24*     (2009.01)
*H04W 52/14*     (2009.01)
*H04W 52/32*     (2009.01)
*H04W 52/42*     (2009.01)

(52) U.S. Cl.
CPC ....... *H04W 52/241* (2013.01); *H04W 52/146* (2013.01); *H04W 52/325* (2013.01); *H04W 52/42* (2013.01)

(58) Field of Classification Search
CPC ............. H04W 52/241; H04W 52/146; H04W 52/325; H04W 52/42
See application file for complete search history.

(56) References Cited

U.S. PATENT DOCUMENTS

| | | | | |
|---|---|---|---|---|
| 2008/0227477 A1* | 9/2008 | Dayal | ................... | H04W 52/08 |
| | | | | 455/522 |
| 2011/0111766 A1* | 5/2011 | Yang | ................... | H04W 52/247 |
| | | | | 455/452.2 |
| 2019/0191384 A1* | 6/2019 | Frenger | ............... | H04W 52/247 |

FOREIGN PATENT DOCUMENTS

CN     106506052 A     3/2017

OTHER PUBLICATIONS

3GPP TSG RAN WG1 NB-IoT Ad-Hoc Meeting, R1-161899, Intel Corporation, Sophia Antipolis, France, Mar. 22-24, 2016, 3 pages.
(Continued)

*Primary Examiner* — John J Lee
(74) *Attorney, Agent, or Firm* — Sonoda & Kobayashi Intellectual Property Law; Sarvajit S. Patil

(57) ABSTRACT

Embodiments of the present disclosure provide method and apparatus for changing radio access technology. A method performed by a network device comprises obtaining channel estimation information of a terminal device; determining an uplink power value according to the channel estimation information and a number of antennas to be used; and transmitting the uplink power value to the terminal device periodically.

20 Claims, 14 Drawing Sheets

(56) References Cited

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300 V16.4.0, Dec. 2020, 391 pages.

"3rd Generation Partnership Project; Technical Specification Group Services and System Aspects; System architecture for the 5G System (5GS); Stage 2 (Release 16)", 3GPP TS 23.501 V16.5.1, Aug. 2020, 440 pages.

3GPP , "3rd Generation Partnership Project; Technical Specification Group Services and System Aspects; Architecture enhancements to facilitate communications with packet data networks and applications (Release 16)", 3GPP TS 23.682 V16.8.0, Sep. 2020, 1-135.

\* cited by examiner

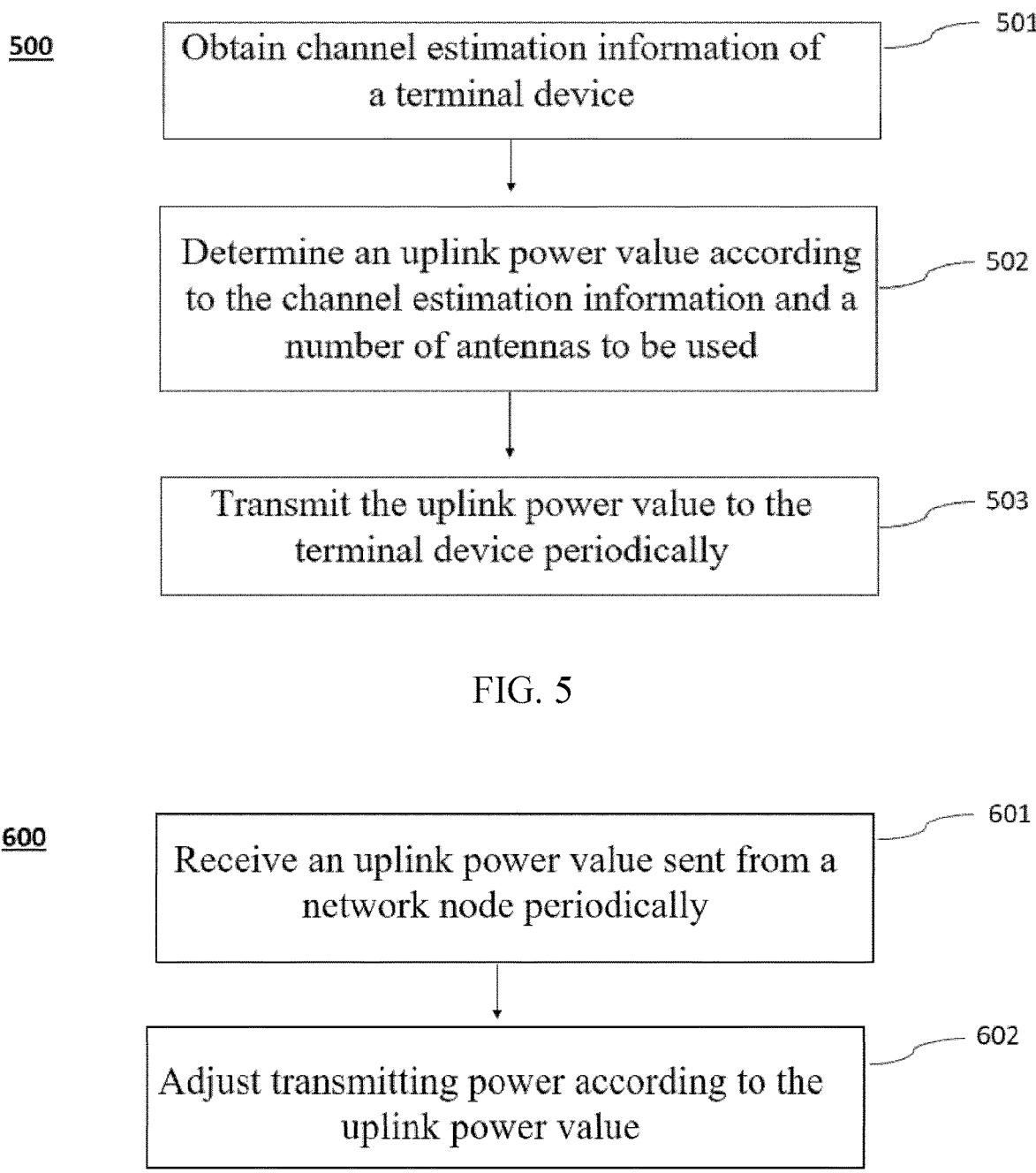

500

Obtain channel estimation information of a terminal device — 501

Determine an uplink power value according to the channel estimation information and a number of antennas to be used — 502

Transmit the uplink power value to the terminal device periodically — 503

Receive an uplink power value sent from a network node periodically — 601

Adjust transmitting power according to the uplink power value — 602

FIG. 6

METHOD AND APPARATUS FOR POWER CONTROL

TECHNICAL FIELD

The non-limiting and exemplary embodiments of the present disclosure generally relate to the technical field of communications, and specifically to methods and apparatuses for power control.

BACKGROUND

Power control is a basic and necessary function in wireless communication systems. It is mostly referring to uplink (UL) power control. Different channel fading for different users, so the received signal in base station will be different, which causes different receiver quality. With power control, every user can have a target to meet the expected result from base station. The simplest power control can be easily described as below:

The longer distance between the receiver and transmitter, the bigger path loss, the lower received power, which causes worse receiver quality. If the transmitter can know the bigger path loss and increase its transmission power, then the receiver quality can be maintained.

The shorter distance between the receiver and transmitter, the smaller path loss, the higher received power, which provides better receiver quality. However, the over-high received power is a waste. If the transmitter can know the smaller path loss and transmit with a lower transmission power, but the receiver quality can still be maintained.

With power control user equipments (UEs) both located in cell center and cell edge can get benefits. The UE located in the cell center can save the battery and keep the high performance. The UE located in the cell edge can have a better performance with the expense of higher transmission power.

There are two kinds of power control mechanisms, which are open-loop and closed-loop.

For open-loop power control, the base station sends a target power to UEs, and the UEs just follow the indication and adjust their powers. The open-loop power control is usually used when a UE first attaches to the network. It has no information about the channel quality, it can only follow what base station asked.

For closed-loop power control, when an uplink signal is received from the UE, the base station will estimate the uplink pathloss, and further check whether the target power is achieved or not. If yes, the base station will check whether it is higher or lower. And then the base station will send more accurate power adjustment to the UE. In this way, the power control can follow the varying receiver condition.

There are two traditional targets used in uplink power control, which are target received power and target uplink signal-to-interference-plus-noise ratio (SINR): based on target received power, based on target uplink SINR.

According to 3GPP 36.300, random access procedure is performed in following conditions:

Initial access from RRC_IDLE;

RRC Connection Re-establishment procedure;

Handover;

DL data arrival during RRC_CONNECTED, e.g. when UL synchronisation status is "non-synchronised".

UL data arrival during RRC_CONNECTED, e.g. when UL synchronisation status is "non-synchronised" or there are no PUCCH resources for SR available.

For positioning purpose during RRC_CONNECTED, e.g. when timing advance is needed for UE positioning.

Establish time alignment for the corresponding STAG in SCell (Carrier Aggregation scenario).

There are two types of Random-Access Procedure, including contention based, shown in FIG. 1, and non-contention based shown in FIG. 2. The difference between them is the preamble sent from UE is known by the base station or not. No matter known or not by the base station, the base station still has no information about the UE position and its related uplink channel condition. So open-loop power control will be used during random access procedure. The inappropriate target received power setting will heavily impact on the random-access success rate.

Studies on closed-loop power control is more popular than open-loop power control. Since it can relate with the network optimization, resource allocation, interference, etc. However, open-loop power control is also important, especially when UE is trying to attach the network. Before access to the network, UE has no information of the UL channel condition, it can only transmit the request based on what expected received power configured by network, which is a broadcasting signal.

Usually, this expected received power is a pre-configured value, and broadcast to all the users. But the UL channel quality is varying all the time:

In busy hours, the inter-cell noise plus interference level is increased a lot;

In Massive MIMO systems, uplink multi-user MIMO is widely used and introduces higher inter-user interference;

Different network may have different noise power;

Interference from other unexpected wireless systems or nature environment;

Thermal noise power is different for different radio hardware;

The radio hardware may be broken.

If only fixed expected received power is used, when the interference level is changed, for sure the uplink SINR will be decreased and then impact on the first access rate. UL first access SINR=expectedRxPower−estimatedNoisePlusInterferencePower. The lower received SINR, the lower random-access success rate. For another, it is impossible for customer to manually tune the parameters based on different site conditions. So, we need a flexible scheme to automatically set the parameters.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

To overcome or mitigate at least one of the above mentioned problems or other problems, an improved solution for power control may be desirable.

In a first aspect of the disclosure, there is provided a method implemented at a network device. The method comprises obtaining channel estimation information of a terminal device. The method further comprises determining an uplink power value according to the channel estimation information and a number of antennas to be used. The method further comprises transmitting the uplink power value to the terminal device periodically.

In an embodiment, obtaining the channel estimation information of the terminal device comprises: obtaining the channel estimation information of the terminal device via an uplink reference signal.

In an embodiment, the number of antenna to be used is configured in system information.

In an embodiment, the uplink reference signal comprises at least one of a sounding reference signal (SRS) or a demodulation reference signal (DMRS).

In an embodiment, determining the uplink power value according to the channel estimation information and the number of antennas to be used comprises: determining path loss information, interference information, and noise evaluation information according to the channel estimation information; and determining the uplink power value according to path loss information, interference information, noise evaluation information, and the number of antennas to be used.

In an embodiment, transmitting the uplink power value to the terminal device comprises: transmitting the uplink power adjustment value to the terminal device via system block information (SIB).

In an embodiment, a period for transmitting the uplink power value is N times a period of the SIB, N is an integer greater than or equal to 1.

In an embodiment, N is determined according to interference level.

In a second aspect of the disclosure, there is provided a method implemented at a terminal device. The method comprises receiving an uplink power value sent from a network node periodically. The method further comprises adjusting transmitting power according to the uplink power value. The uplink power value is determined according to channel estimation information and a number of antennas to be used.

In an embodiment, before receiving the uplink power value sent from the network node, the method further comprises: transmitting an uplink reference signal for channel estimation.

In an embodiment, the number of antenna to be used is configured in system information.

In an embodiment, wherein the uplink reference signal comprises at least one of a sounding reference signal (SRS) or a demodulation reference signal (DMRS).

In an embodiment, wherein path loss information, interference information, and noise evaluation information are determined according to the channel estimation information; the uplink power value is determined according to path loss information, interference information, noise evaluation information, and the number of antennas to be used.

In an embodiment, receiving the uplink power value sent from the network node comprises: receiving the uplink power value sent from the network node via system block information (SIB).

In an embodiment, a period for receiving the uplink power adjustment value is N times a period of the SIB, N is an integer greater than or equal to 1.

In an embodiment, N is determined according to interference level changing frequency.

In a third aspect of the disclosure, there is provided a network device. The network device comprises a processor; and a memory coupled to the processor, said memory containing instructions executable by said processor, whereby said network device is operative to obtain channel estimation information of a terminal device. Said network device is further operative to determine an uplink power value according to the channel estimation information and a number of antennas to be used. Said network device is further operative to transmit the uplink power value to the terminal device periodically.

In a fourth aspect of the disclosure, there is provided a terminal device. The terminal device comprises a processor; and a memory coupled to the processor, said memory containing instructions executable by said processor, whereby said terminal device is operative to receive an uplink power value sent from a network node periodically. Said terminal device is further operative to adjust a transmitting power according to the uplink power value. The uplink power value is determined according to channel estimation information and a number of antennas to be used.

In a fifth aspect of the disclosure, there is provided a network device according to an embodiment of the disclosure. The network device comprises a obtaining module, a determining module, and a transmitting module. The obtaining module may be configured to obtain the channel estimation information of the terminal device. The determining module may be configured to determine an uplink power value according to the channel estimation information and a number of antennas to be used. The transmitting module may be configured to transmit the uplink power value to the terminal device periodically.

In an embodiment, the obtaining module is further configured to obtain the channel estimation information of the terminal device via an uplink reference signal.

In an embodiment, the number of antenna to be used is configured in system information.

In an embodiment, the uplink reference signal comprises at least one of a sounding reference signal (SRS) or a demodulation reference signal (DMRS).

In an embodiment, the determining module is further configured to determine path loss information, interference information, and noise evaluation information according to the channel estimation information; and determine the uplink power value according to path loss information, interference information, noise evaluation information, and the number of antennas to be used.

In an embodiment, the transmitting module is further configured to transmit the uplink power adjustment value to the terminal device via system block information (SIB).

In an embodiment, a period for transmitting the uplink power value is N times a period of the SIB, N is an integer greater than or equal to 1.

In an embodiment, N is determined according to interference level.

In a sixth aspect of the disclosure, there is provided a terminal device. The terminal device comprises a receiving module configured to receive an uplink power value sent from a network node periodically and an adjusting module and an adjusting module configured to adjust a transmitting power according to the uplink power value. The uplink power value is determined according to channel estimation information and a number of antennas to be used.

In an embodiment, the terminal device further comprises a transmitting module configured to, before receiving the uplink power adjustment value sent from the network node, transmit an uplink reference signal for channel estimation.

In an embodiment, the number of antenna to be used is configured in system information.

In an embodiment, the uplink reference signal comprises at least one of a sounding reference signal (SRS) or a demodulation reference signal (DMRS).

In an embodiment, path loss information, interference information, and noise evaluation information is determined according to the channel estimation information; the uplink power value is determined according to path loss information, interference information, noise evaluation information, and the number of antennas to be used.

In an embodiment, the receiving module is further configured to receiving the uplink power value sent from the network node via system block information (SIB).

In an embodiment, a period for receiving the uplink power adjustment value is N times a period of the SIB, N is an integer greater than or equal to 1.

In an embodiment, N is determined according to interference level.

In a seventh aspect of the disclosure, there is provided a computer-readable storage medium storing instructions which when executed by at least one processor, cause the at least one processor to perform the method according to any one of the first and second aspects.

In an eighth aspect of the disclosure, there is provided a computer program product comprising instructions which when executed by at least one processor, cause the at least one processor to perform the method according to any one of the first and second aspects.

In another aspect of the disclosure, there is provided a communication system including a host computer including: processing circuitry configured to provide user data; and a communication interface configured to forward the user data to a cellular network for transmission to a terminal device. The cellular network includes the network device above mentioned, and/or the terminal device above mentioned.

In embodiments of the present disclosure, the system further includes the terminal device, wherein the terminal device is configured to communicate with the network device.

In embodiments of the present disclosure, the processing circuitry of the host computer is configured to execute a host application, thereby providing the user data; and the terminal device includes processing circuitry configured to execute a client application associated with the host application.

In another aspect of the disclosure, there is provided a communication system including a host computer including: a communication interface configured to receive user data originating from a transmission from a terminal device; a network device. The transmission is from the terminal device to the network device. The network device is above mentioned, and/or the terminal device is above mentioned.

In embodiments of the present disclosure, the processing circuitry of the host computer is configured to execute a host application. The terminal device is configured to execute a client application associated with the host application, thereby providing the user data to be received by the host computer.

In another aspect of the disclosure, there is provided a method implemented in a communication system which may include a host computer, a network device and a terminal device. The method may comprise providing user data at the host computer. Optionally, the method may comprise, at the host computer, initiating a transmission carrying the user data to the terminal device via a cellular network comprising the network device which may perform any step of the method according to the first aspect of the present disclosure.

In another aspect of the disclosure, there is provided a communication system including a host computer. The host computer may comprise processing circuitry configured to provide user data, and a communication interface configured to forward the user data to a cellular network for transmission to a terminal device. The cellular network may comprise a network device having a radio interface and processing circuitry. The network device's processing circuitry may be configured to perform any step of the method according to the first aspect of the present disclosure.

In another aspect of the disclosure, there is provided a method implemented in a communication system which may include a host computer, a network device and a terminal device. The method may comprise providing user data at the host computer. Optionally, the method may comprise, at the host computer, initiating a transmission carrying the user data to the terminal device via a cellular network comprising the network device. The terminal device may perform any step of the method according to the second aspect of the present disclosure.

In another aspect of the disclosure, there is provided a communication system including a host computer. The host computer may comprise processing circuitry configured to provide user data, and a communication interface configured to forward user data to a cellular network for transmission to a terminal device. The terminal device may comprise a radio interface and processing circuitry. The terminal device's processing circuitry may be configured to perform any step of the method according to the second aspect of the present disclosure.

In another aspect of the disclosure, there is provided a method implemented in a communication system which may include a host computer, a network device and a terminal device. The method may comprise, at the host computer, receiving user data transmitted to the network device from the terminal device which may perform any step of the method according to the second aspect of the present disclosure.

In another aspect of the disclosure, there is provided a communication system including a host computer. The host computer may comprise a communication interface configured to receive user data originating from a transmission from a terminal device to a network device. The terminal device may comprise a radio interface and processing circuitry. The terminal device's processing circuitry may be configured to perform any step of the method according to the second aspect of the present disclosure.

In another aspect of the disclosure, there is provided a method implemented in a communication system which may include a host computer, a network device and a terminal device. The method may comprise, at the host computer, receiving, from the network device, user data originating from a transmission which the network device has received from the terminal device. The network device may perform any step of the method according to the first aspect of the present disclosure.

In another aspect of the disclosure, there is provided a communication system which may include a host computer. The host computer may comprise a communication interface configured to receive user data originating from a transmission from a terminal device to a network device. The network device may comprise a radio interface and processing circuitry. The network device's processing circuitry may be configured to perform any step of the method according to the first aspect of the present disclosure.

Embodiments herein may provide many advantages, of which a non-exhaustive list of examples follows. The UE random access success rate will be increased in the high or varying interference scenario. The UL performance will be improved in the following scenarios:

When a UE has imbalanced DL and UL traffics, e.g. less or even NO DL traffic but with big UL traffic;

UE is just back from a silence mode (no traffic require-ment), and interference level may have already changed;

Vendors who are use the target power-based UL power control.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 5 is a flowchart of a method for power control according to an embodiment of the present disclosure;

FIG. 6 is a flowchart of a method for power control according to another embodiment of the present disclosure;

DETAILED DESCRIPTION

Figure 1:
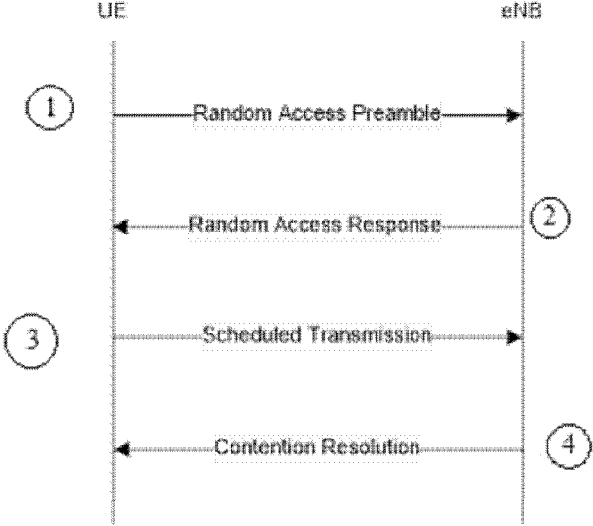
FIG. 1 is a schematic diagram of contention based random access procedure in LTE.
Figure 2:
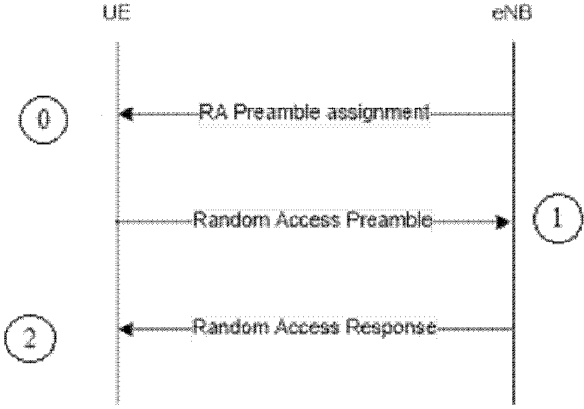
FIG. 2 is a schematic diagram of Non-contention based random access procedure in LTE.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, lan-guage referring to the features and advantages is understood to mean that a specific feature, advantage, or characteristic described in connection with an embodiment is included in at least one embodiment of the present disclosure. Further-more, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional fea-tures and advantages may be recognized in certain embodi-ments that may not be present in all embodiments of the disclosure.

As used herein, the term "network" refers to a network following any suitable communication standards such as new radio (NR), long term evolution (LTE), LTE-Advanced, wideband code division multiple access (WADA), high-speed packet access (HSPA), Code Division Multiple Access (CDMA), Time Division Multiple Address (TDMA), Fre-quency Division Multiple Access (FDMA), Orthogonal Fre-quency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communica-tions (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the com-munication protocols may comprise the first generation (1G), 2G, 3G, 4G, 4.5G, 5G communication protocols, and/or any other protocols either currently known or to be developed in the future.

The term "network device" refers to any suitable network function (NF) which can be implemented in a network entity (physical or virtual) of a communication network. For example, the network function can be implemented either as a network element on a dedicated hardware, as a software instance running on a dedicated hardware, or as a virtualized function instantiated on an appropriate platform, e.g. on a cloud infrastructure. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service com-munication proxy), NWDAF (network data analytics function), NS SF (Network Slice Selection Function), NSSAAF (Network Slice-Specific Authentication and Authorization Function), etc. For example, the 4G system (such as LTE) may include MME (Mobile Management Entity), HSS (home subscriber server), Policy and Charging Rules Function (PCRF), Packet Data Network Gateway (PGW), PGW control plane (PGW-C), Serving gateway (SGW), SGW control plane (SGW-C), E-UTRAN Node B (eNB),etc. In other embodiments, the network function may comprise different types of NFs for example depending on a specific network.

The network device may be an access network device with accessing function in a communication network via which a terminal device accesses to the network and receives services therefrom. The access network device may include a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), an Integrated Access and Backhaul (IAB) node, a remote radio head (RRH), a relay, a low power node such as a femto, a pico, and so forth.

Yet further examples of the access network device comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP (3rd Generation Partnership Project), such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" or "at least one of A or B" should be understood to mean "only A, only B, or both A and B." The phrase "A and/or B" should be understood to mean "only A, only B, or both A and B".

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

Figure 3:
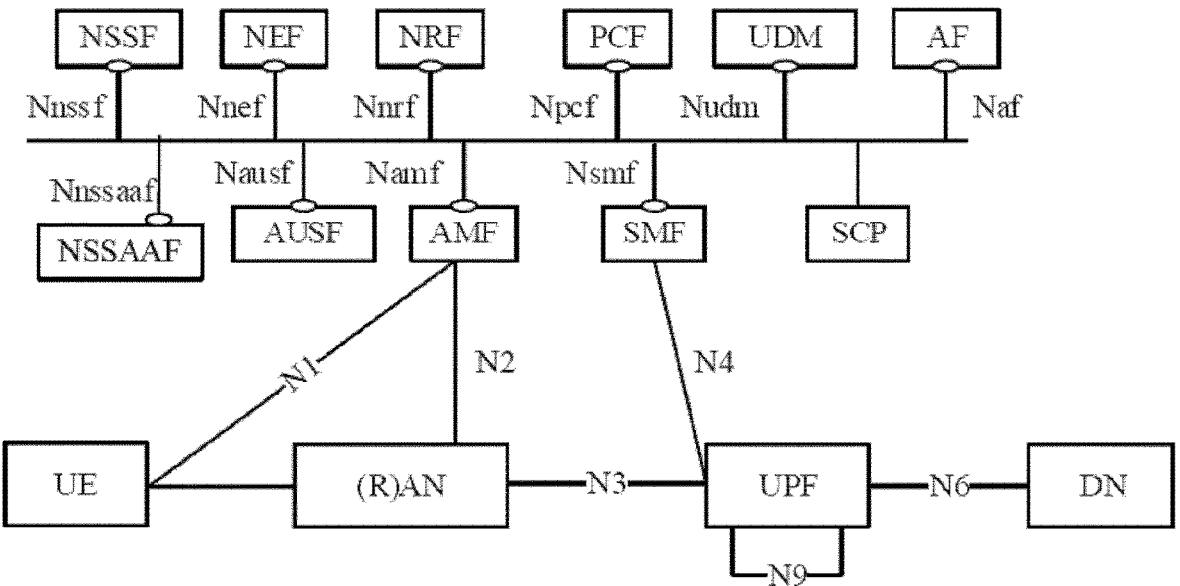
FIG. 3 is a schematic diagram of is a system architecture in a 5G network according to an embodiment of the present disclosure.
Figure 4:
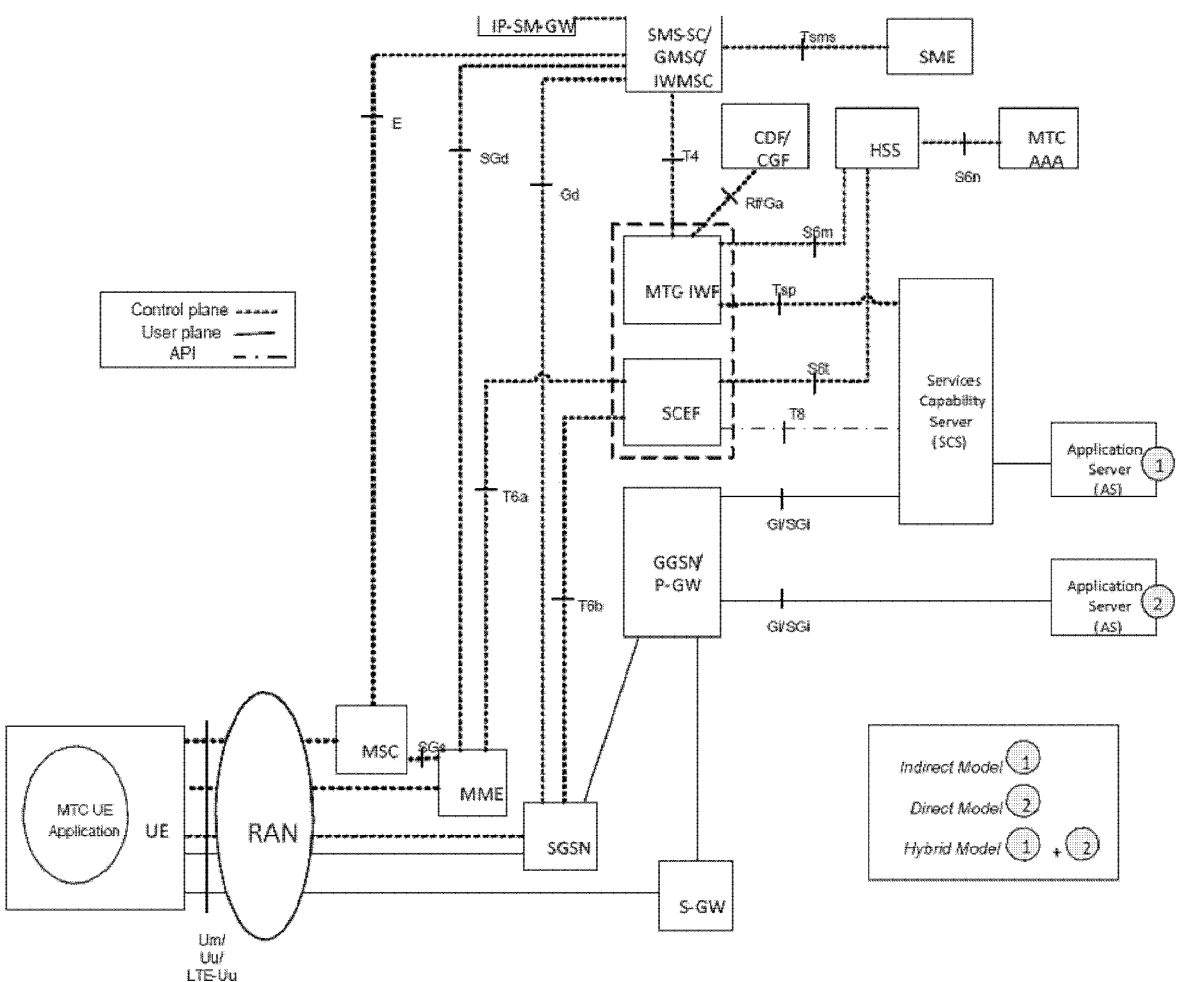
FIG. 4 schematically shows a system architecture in a 4G network according to an embodiment of the present disclo-sure.

Although the subject matter described herein may be implemented in any appropriate type of system using any suitable components, the embodiments disclosed herein are described in relation to a communication system complied with the exemplary system architectures illustrated in FIGS. 3-4. For simplicity, the system architectures of FIGS. 3-4 only depict some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 3 schematically shows a high level architecture in the fifth generation network according to an embodiment of the present disclosure. For example, the fifth generation network may be 5GS. The architecture of FIG. 3 is same as FIG. 4.2.3-1 as described in 3GPP TS 23.501 V16.5.1, the disclosure of which is incorporated by reference herein in its entirety. The system architecture of FIG. 3 may comprise some exemplary elements such as AUSF, AMF, DN (data network), NEF, NRF, NSSF, PCF, SMF, UDM, UPF, AF, UE, (R)AN, SCP (Service Communication Proxy), NSSAAF (Network Slice-Specific Authentication and Authorization Function), etc.

In accordance with an exemplary embodiment, the UE can establish a signaling connection with the AMF over the reference point N1, as illustrated in FIG. 3. This signaling connection may enable NAS (Non-access stratum) signaling exchange between the UE and the core network, comprising a signaling connection between the UE and the (R)AN and the N2 connection for this UE between the (R)AN and the AMF. The (R)AN can communicate with the UPF over the reference point N3. The UE can establish a protocol data unit (PDU) session to the DN (data network, e.g. an operator network or Internet) through the UPF over the reference point N6.

As further illustrated in FIG. 3, the exemplary system architecture also contains the service-based interfaces such as Nnrf, Nnef, Nausf, Nudm, Npcf, Namf and Nsmf exhibited by NFs such as the NRF, the NEF, the AUSF, the UDM, the PCF, the AMF and the SMF. In addition, FIG. 3 also shows some reference points such as N1, N2, N3, N4, N6 and N9, which can support the interactions between NF services in the NFs. For example, these reference points may be realized through corresponding NF service-based interfaces and by specifying some NY service consumers and providers as well as their interactions in order to perform a particular system procedure.

Various NFs shown in FIG. 3 may be responsible for functions such as session management, mobility management, authentication, security, etc. The AUSF, AMF, DN, NEF, NRF, NSSF, PCF, SMF, UDM, UPF, AF, UE, (R)AN, SCP may include the functionality for example as defined in clause 6.2 of 3GPP TS23.501 V16.5.1.

FIG. 4 schematically shows a system architecture in a 4G network according to an embodiment of the present disclosure, which is the same as FIG. 4.2-1a of 3GPP TS 23.682 V16.8.0, the disclosure of which is incorporated by reference herein in its entirety. The system architecture of FIG. 4 may comprise some exemplary elements such as Services Capability Server (SCS), Application Server (AS), SCEF, HSS, UE, RAN (Radio Access Network), SGSN (Serving GPRS (General Packet Radio Service) Support Node), MME, MSC (Mobile Switching Centre), S-GW (Serving Gateway), GGSN/P-GW (Gateway GPRS Support Node/ PDN (Packet Data Network) Gateway), MTC-IWF (Machine Type Communications-InterWorking Function) CDF/ CGF (Charging Data Function/Charging Gateway Function), MTC-AAA (Machine Type Communications-authentication, authorization and accounting), SMS-SC/ GMSC/IWMSC (Short Message Service-Service Centre/ Gateway MSC/InterWorking MSC) IP-SM-GW (Internet protocol Short Message Gateway). The network elements and interfaces as shown in FIG. 4 may be same as the corresponding network elements and interfaces as described in 3GPP TS 23.682 V16.8.0.

FIG. 5 shows a flowchart of a method for power control according to an embodiment of the present disclosure, which may be performed by an apparatus implemented in or at or as a network device or communicatively coupled to the network device. As such, the apparatus may provide means or modules for accomplishing various parts of the method 500 as well as means or modules for accomplishing other processes in conjunction with other components. The network device may be any suitable network device such as access network device.

At block 501, the network device may channel estimation information of a terminal device.

At block 502, the network may determine an uplink power value according to the channel estimation information and a number of antennas to be used. In the open loop power control procedure, the uplink power value is a power value, in the closed loop power control procedure, the uplink power value is a power offset value.

At block 503, the network may transmit the uplink power value to the terminal device periodically.

With the above method, the UE random access success rate will be increased in the high or varying interference scenario, the UL performance will be improved in the following scenarios:

When a UE has imbalanced DL and UL traffics, e.g. less or even NO DL traffic but with big UL traffic;

UE is just back from a silence mode (no traffic requirement), and interference level may have already changed;

Vendors who are use the target power-based UL power control.

In an embodiment, the network may obtain the channel estimation information of the terminal via an uplink reference signal.

In an embodiment, the number of antenna to be used may be configured in system information.

In an embodiment, the uplink reference signal may comprise at least one of a sounding reference signal (SRS) or a demodulation reference signal (DMRS).

In an embodiment, path loss information, interference information, and noise evaluation information may be determined according to the channel estimation information; the uplink power value is determined according to path loss information, interference information, noise evaluation information, and the number of antennas to be used.

In an embodiment, the uplink power value sent may be sent via system block information (SIB).

In an embodiment, a period for receiving the uplink power adjustment value may be N times a period of the SIB, N is an integer greater than or equal to 1.

In an embodiment, N may be determined according to interference level.

FIG. 6 shows a flowchart of a method for power control according to another embodiment of the present disclosure, which may be performed by an apparatus implemented in or at or as the terminal device or communicatively coupled to the terminal device. As such, the apparatus may provide means or modules for accomplishing various parts of the method 600 as well as means or modules for accomplishing other processes in conjunction with other components. For some parts which have been described in the above embodiments, the description thereof is omitted here for brevity.

At block 601, the terminal device may receive an uplink power value sent from a network node periodically.

At block 602, the network device may adjust transmitting power according to the uplink power value. The uplink power value may be determined according to channel estimation information and a number of antennas to be used.

In an embodiment, before receiving the uplink power value sent from the network node, the method may further comprise: transmitting an uplink reference signal for channel estimation.

In an embodiment, the number of antenna to be used may be configured in system information.

In an embodiment, the uplink reference signal may comprise at least one of a sounding reference signal (SRS) or a demodulation reference signal (DMRS).

In an embodiment, path loss information, interference information, and noise evaluation information may be determined according to the channel estimation information; the uplink power value may be determined according to path loss information, interference information, noise evaluation information, and the number of antennas to be used.

In an embodiment, receiving the uplink power value sent from the network node may comprise: receiving the uplink power value sent from the network node via system block information (SIB).

In an embodiment, a period for receiving the uplink power adjustment value may be N times a period of the SIB, N is an integer greater than or equal to 1.

In an embodiment, N may be determined according to interference level.

Figure 7:
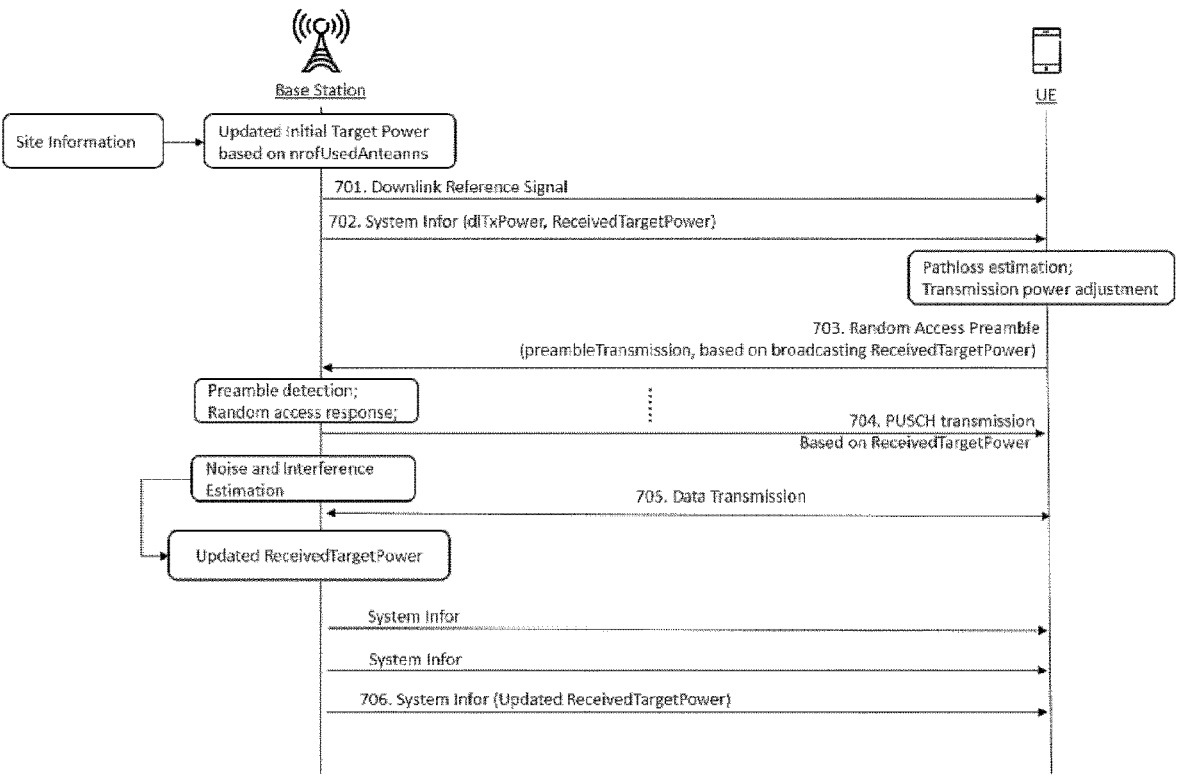
FIG. 7 is a flowchart of a method for power control according to another embodiment of the present disclosure.

FIG. 7 shows a flowchart of a method for power control according to another embodiment of the present disclosure.

At block 701, a base station may obtain site information that includes the number of antennas to be used, update initial target power according to the number of antennas to be used, and transmit a cell level reference signal (RS) to a terminal device. Here the RS may be CRS or CSI-RS. The RS may be used by the terminal device for downlink channel estimation, downlink received power and interference estimation, downlink pathloss estimation and some data decoding.

In an embodiment, pathloss may be formulated by $$P_{PL}^{DL} = P_{tx}^{DL} - P_{rx}^{DL}, \text{ where } P_{PL}^{DL}$$

is the estimated DL path loss, $$P_{tx}^{DL}$$

is the DL transmission power from the base station, which is indicated in the system information, and $$P_{rx}^{DL}$$

is the DL received power by UE.

The initial target power is set by the operator, which is one of the key factors for network interference control. With the same initial target power in each time and frequency resources, the interference level can be easily controlled. The lower the initial target power, the lower interference level between different cells and different users if uplink multi-user is configured.

The uplink received power is also related to the number of used antennas in the cell. The more antennas used, the more antenna gain can be obtained, which implies the lower initial target power may be set since antenna gain can be a compensation.

$$ulSinr = uplinkRxPower + antGain - InterferencePlus-Noise.$$

Where ulSinr is SINR of Uplink, uplinkRxPower is uplink received power, antGain is the received gain with more antennas reception, and InterferencePlusNoise is interference and noise.

In recent two years, massive MIMO is widely deployed by operators. To have a good and simple network optimization, it is better to keep the same UL interference level, which means even different antennas are used for UL reception, we should keep the same initial target power in different frequency resources. Besides, it is not friendly for operators to adjust the initial target power site by site based on different number of antennas, So, in this step, it is proposed to update the initial target power based on the number of used antennas internally/automatically.

In an embodiment, if we set $$P_0^{base}$$

in dBm as a baseline for 2 Rx antenna systems. Then the updated $P_0$ setting in dBm will be:

$$P_0 = P_0^{base} - 10 * \log\left(\frac{N_{ant}}{2}\right)$$

Where $P_0$ is the target received power, $$P_0^{base}$$

is the target received power for 2 antenna, $N_{ant}$ is the number of used antenna.

Here, $N_{ant}$ is the number of used antennas, which is a site parameter, base station may easily get it from the site information. When completing the setting, it may be broadcast to the terminal devices in the SIB.

This proposal cannot only be used in cell setup, but also be used when number of used antennas are updated, for example, in a scenario where some of the antennas are muted to save the energy in the base station, for another example, in a scenario where hardware failure occurs, some of the antennas are broken and cannot work normally.

In these conditions, the function of initial target power updating may also be utilized and then broadcast to the UE. In this way, we can get the balance between power saving and performance maintain.

At block 702, the Base station transmits the downlink transmit power, updated target power to UE in the system information. Here, the updated target power is the power updated based on the initial target power and number of used antennas in the corresponding cell. Here the updated target power includes at least one of preamble received target power, pusch received target power.

At block 703, the terminal device may determine its preamble transmission power based on the updated target power and pathloss estimation result. Preamble transmission is the first step before the terminal device accessing to the network. It can be contention-based or non-contention-based transmission. To maintain the fairness, each UE is using the same required preamble received target power $$P_{tgt}^{preamble}$$

from base station. The terminal device may obtain the downlink pathloss $P_{pathloss}$ from the RS channel estimation. It can also have the downlink transmission power from SIB. The formulation may be:

$$P_{tx}^{preamble} = P_{tgt}^{preamble} + P_{pathloss}$$

Here, $$P_{tgt}^{preamble}$$

is what BS updated target power based on number of used antennas, that is the preamble received target power, $$P_{tx}^{preamble}$$

is the preamble transmission power.

At block 704, the terminal device performs normal uplink data transmission after accessed to the network, and the PUSCH transmission power $$P_{tx}^{PUSCH}$$

is based on pusch received target power $$P_{tgt}^{PUSCH}:$$

$$P_{tx}^{PUSCH} = P_{tgt}^{PUSCH} + P_{pathloss}$$

At block 705, the base station perform interference and noise estimation based on received uplink reference signals and adjusts the received Target Power based on interference and noise estimation. Interference plus noise may be calculated based on the uplink RS channel estimation. There are several algorithms for interference estimation, e.g., Minimum Mean Square Error (MMSE), Interference Rejection Combining (IRC), Maximum Ratio Combining (MRC), etc. Received power of PUSCH $P_{rx}$ can also be gotten based on the uplink channel estimation.

In this step, UL SINR can also be obtained based on the received power and estimated interference.

The rxPowerPusch and ulPuschSinr will be used for PUSCH closed-loop power control.

PUSCH Received Target Power Adjustment

The criteria for setting the appropriate target received power is relevant to the highest modulation mode, 256QAM/64QAM/16QAM/QPSK. The higher modulation mode, the higher uplink SINR is required, which means, when the noise level is stable, it requires the higher received power. Each vendor has its own internal mapping table. Usually, it is simulated based on the AWGN channel. E.g. if 64QAM peak rate is needed, the needed SINR will be 24 dB.

$$SINR_{UL}^{Mod} = P_{rx} - P_N, \text{ where } SINR_{UL}^{Mod}$$

is UL target SINR, $P_{rx}$ is received power of PUSCH, $P_N$ is set as the thermal noise power of the site.

But as the system and traffic become complex, only noise level is not enough, interference is the key factor for UL channel condition. Thus, above formula will be updated as $$SINR_{UL}^{Mod} = P_{rx} - P_{ipn},$$

where $P_{ipn}$ is power of interference plus noise.

Our new idea here is, when $P_{ipn}$ is changed in a range, the target received power will be updated by:

$$P_{rx}^{Tgt} = SINR_{UL}^{Mod} + P_{ipn}, \text{ where, } SINR_{UL}^{Mod}$$

is set accordingly based on different modulation mode.

Since the interference level can be changed in any conditions, for example, in following scenarios:

Inter-RAT interference, other RATs are operating in the same frequency but without efficient spectrum sharing scheme;

Different traffic loads among the cells. When cell load is high, especially when multi-user is introduced, the interference level maybe varies with the increased number of layers. For another, if the traffic load is not balanced in the live network, interference level is difference in each site.

These kinds of interference are not fixed, they may be changed at any time. Thus, interference level filtering is prerequisite to avoid ping-pong effect. The filtering can be done as below:

$$P_{ipn}^{filtered} = (1 - \alpha) * P_{ipn}^{filtered} + \alpha * P_{ipn},$$

where, $P_{ipn}$ is the instantaneous value, $$P_{ipn}^{filtered}$$

is the filtered result, $\alpha$ is the filtering factor. It can be a fixed value, or a dynamic value based on the time interval between two adjacent estimations. Finally, the target received power will be determined by:

$$P_{rx}^{Tgt} = SINR_{UL}^{Mod} + P_{ipn}^{filtered}$$

It can be seen that, the higher $P_{rx}$ does not always mean the better UL receiver quality. Specifically, the higher target received power could imply higher interference between each-other in some circumstances. Therefore, the performance is potentially affected when interference becomes excessively high. And it is better to have an upper limit for the $P_{rx}$. When $P_{rx}$ is large enough, in order to maintain the network interference at a reasonable level, it is suggested to limit the $$P_{rx}^{Tgt}$$

lower than $$P_{yx}^{max}, \text{ where } P_{rx}^{max}$$

is a maximum value of the received power.

$$P_{rx}^{max}$$

can be configured by operator, which considers the network interference level, so both serving cell and inter-cell interference limitation can be considered.

So with this adjustment, when the interference level is increased, $$P_{ipn}^{filtered}$$

will be increased as well, a higher target received power $$P_{rx}^{Tgt}$$

will be set. Meanwhile, to limit the too-high interference to neighbor cells, $$P_{rx}^{Tgt}$$

must be lower than $$P_{rx}^{max}.$$

When the interference level becomes lower, $$P_{ipn}^{filtered}$$

will be degraded accordingly, thus a lower target received power $$P_{rx}^{Tgt}$$

will be set.

Preamble Received Target Power Adjustment

When the interference plus noise (IpN) is changed in a range, it is suggested to change the preamble received target Power as follows:

$$P_{tgt}^{preamble} = P_{tgt}^{preamble} - \Delta_{adj}^{preamble}, \Delta_{adj}^{preamble} = P_{ipn} - P_{ipn}^{last};$$

Here, the range can be configured, to avoid ping-pong effect, it is suggested to set the unit as 5 dB.

$$P_{tgt}^{preamble}$$

is received target power after the adjustment.

$$P_{ipn}^{last}$$

is the IpN during last targetPower broadcasting. The initial value of $$P_{ipn}^{last}$$

is the thermal noise of the hardware, usually it is $-118$ dBm or a little bit smaller.

$$\Delta_{adj}^{preamble}$$

is the IpN gap between current estimation and last broadcasting.

At block 706, the base station transmits the updated received target power periodically, which is obtained by adjusting received target power based on the interference and noise estimation in block 705. The period for transmitting the updated received target power may be N times a period of the SIB, N is an integer greater than or equal to 1. N may be determined according to interference level.

The embodiments herein are not limited to the features and advantages mentioned above. A person skilled in the art will recognize additional features and advantages upon reading the following detailed description.

Figure 8:
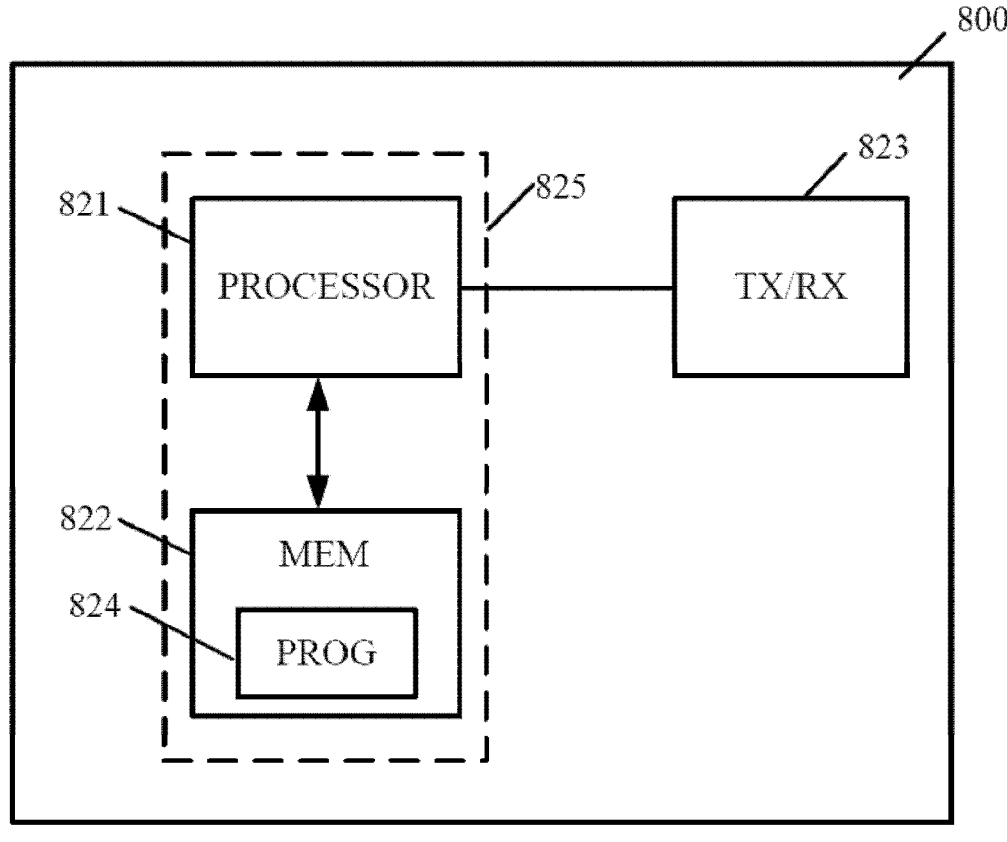
FIG. 8 is a block diagram showing an apparatus suitable for practicing some embodiments of the disclosure.

FIG. 8 is a block diagram showing an apparatus suitable for practicing some embodiments of the disclosure. For example, any one of the terminal device and the network device described above may be implemented as or through the apparatus 800.

The apparatus 800 comprises at least one processor 821, such as a digital processor (DP), and at least one memory (MEM) 822 coupled to the processor 821. The apparatus 820 may further comprise a transmitter TX and receiver RX 823 coupled to the processor 821. The MEM 822 stores a program (PROG) 824. The PROG 824 may include instructions that, when executed on the associated processor 821, enable the apparatus 820 to operate in accordance with the embodiments of the present disclosure. A combination of the at least one processor 821 and the at least one MEM 822 may form processing means 825 adapted to implement various embodiments of the present disclosure.

Various embodiments of the present disclosure may be implemented by computer program executable by one or more of the processor 821, software, firmware, hardware or in a combination thereof.

The MEM 822 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 821 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the terminal device, the memory 822 contains instructions executable by the processor 821, whereby the terminal device operates according to any of the methods related to the terminal device as described above.

In an embodiment where the apparatus is implemented as or at the network device, the memory 822 contains instructions executable by the processor 821, whereby the network device operates according to any of the methods related to the network device as described above.

Figure 9:
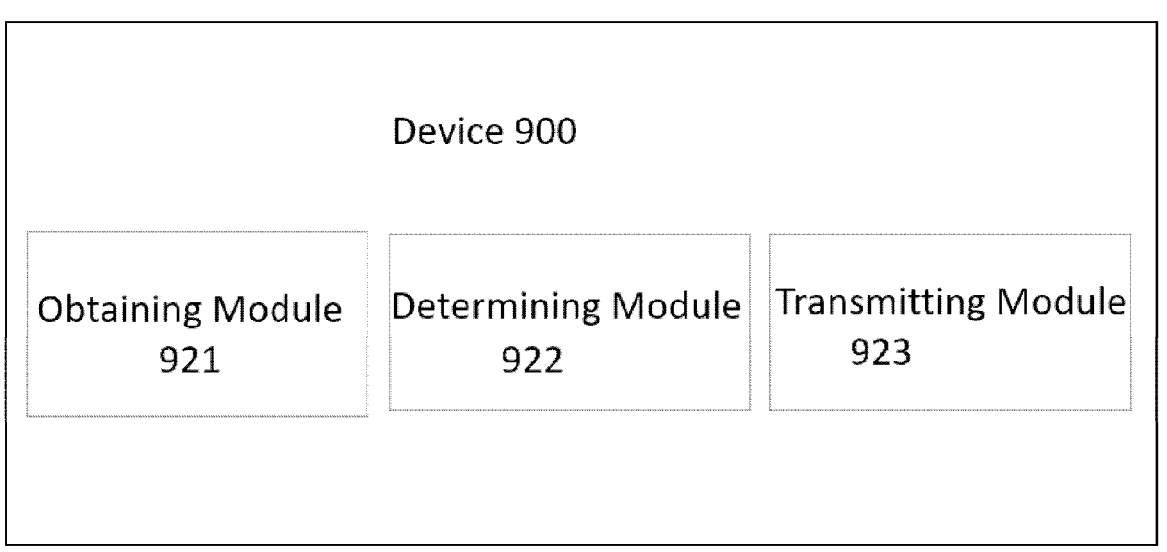
FIG. 9 is a block diagram of a network device according to an embodiment of the disclosure.

FIG. 9 is a block diagram showing a network device according to an embodiment of the disclosure. As shown, the network device 900 comprises an obtaining module 921, a determining module 922, and a transmitting module 923. The obtaining module 921 may be configured to obtain the channel estimation information of the terminal device. The determining module 922 may be configured to determine an uplink power value according to the channel estimation information and a number of antennas to be used. The transmitting module 923 may be configured to transmit the uplink power value to the terminal device periodically.

In an embodiment, the obtaining module 921 may be further configured to obtain the channel estimation information of the terminal device via an uplink reference signal.

In an embodiment, the number of antenna to be used is configured in system information.

In an embodiment, the uplink reference signal comprises at least one of a sounding reference signal (SRS) or a demodulation reference signal (DMRS).

In an embodiment, the determining module 922 may be further configured to determine path loss information, interference information, and noise evaluation information according to the channel estimation information; and determine the uplink power value according to path loss information, interference information, noise evaluation information, and the number of antennas to be used.

In an embodiment, the transmitting module 923 may be further configured to transmit the uplink power adjustment value to the terminal device via system block information (SIB).

In an embodiment, a period for transmitting the uplink power value is N times a period of the SIB, N is an integer greater than or equal to 1.

Figure 10:
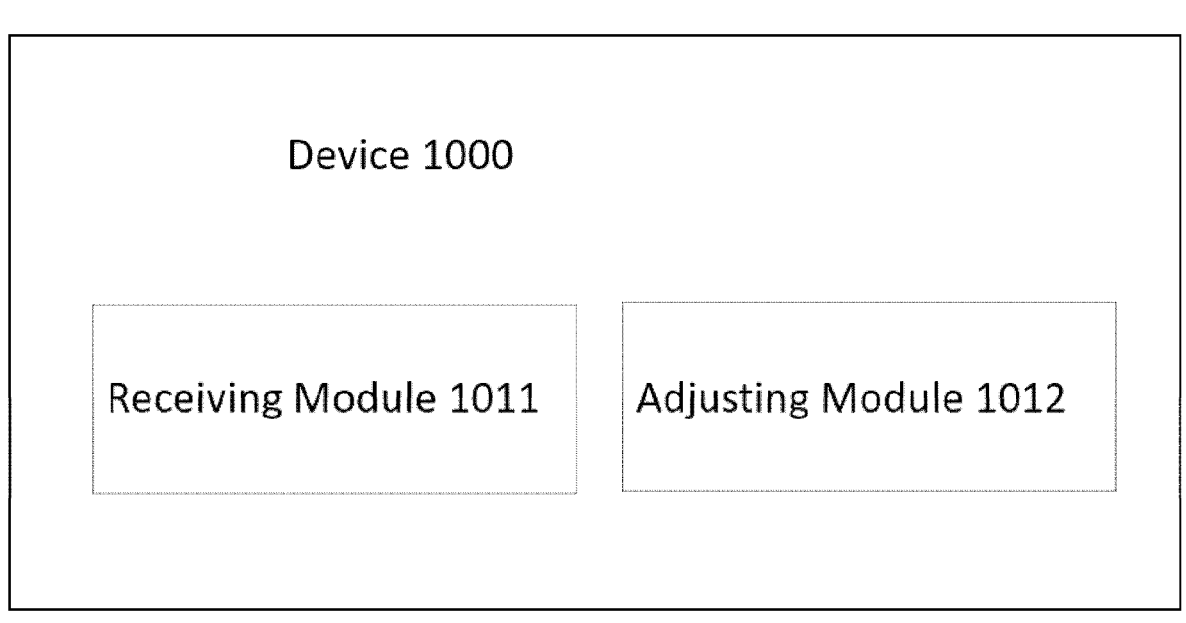
FIG. 10 is a block diagram of a terminal device according to an embodiment of the disclosure.

FIG. 10 is a block diagram showing a terminal device according to an embodiment of the disclosure. As shown, the terminal device 1000 comprises a receiving module 1011 and an adjusting module 1012, The receiving module 1011 may be configured to receive an uplink power value sent from a network node periodically, and the adjusting module 1012 may be configured to adjust a transmitting power according to the uplink power value. The uplink power value is determined according to channel estimation information and a number of antennas to be used.

In an embodiment, the terminal device 900 may further comprise a transmitting module configured to, before receiving the uplink power adjustment value sent from the network node, transmit an uplink reference signal for channel estimation.

In an embodiment, the number of antenna to be used is configured in system information.

In an embodiment, the uplink reference signal may comprise at least one of a sounding reference signal (SRS) or a demodulation reference signal (DMRS).

In an embodiment, path loss information, interference information, and noise evaluation information may be determined according to the channel estimation information; the uplink power value is determined according to path loss information, interference information, noise evaluation information, and the number of antennas to be used.

In an embodiment, the receiving module 1011 may be further configured to receiving the uplink power value sent from the network node via system block information (SIB).

In an embodiment, a period for receiving the uplink power adjustment value is N times a period of the SIB, N is an integer greater than or equal to 1.

In an embodiment, N may be determined according to interference level.

The term unit or module may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such those that are described herein.

With function units, the network device and the terminal device may not need a fixed processor or memory, any computing resource and storage resource may be arranged from the network device and the terminal device in the communication system. The introduction of virtualization technology and network computing technology may improve the usage efficiency of the network resources and the flexibility of the network.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

Further, the exemplary overall commutation system including the terminal device and the base station such as the network device will be introduced as below.

Embodiments of the present disclosure provide a communication system including a host computer including: processing circuitry configured to provide user data; and a communication interface configured to forward the user data to a cellular network for transmission to a terminal device. The cellular network includes a base station above mentioned, and/or the terminal device is above mentioned.

In embodiments of the present disclosure, the system further includes the terminal device, wherein the terminal device is configured to communicate with the base station.

In embodiments of the present disclosure, the processing circuitry of the host computer is configured to execute a host application, thereby providing the user data; and the terminal device includes processing circuitry configured to execute a client application associated with the host application.

Embodiments of the present disclosure also provide a communication system including a host computer including: a communication interface configured to receive user data originating from a transmission from a terminal device; a base station. The transmission is from the terminal device to the base station. The base station is above mentioned, and/or the terminal device is above mentioned.

In embodiments of the present disclosure, the processing circuitry of the host computer is configured to execute a host application. The terminal device is configured to execute a client application associated with the host application, thereby providing the user data to be received by the host computer.

Figure 11:
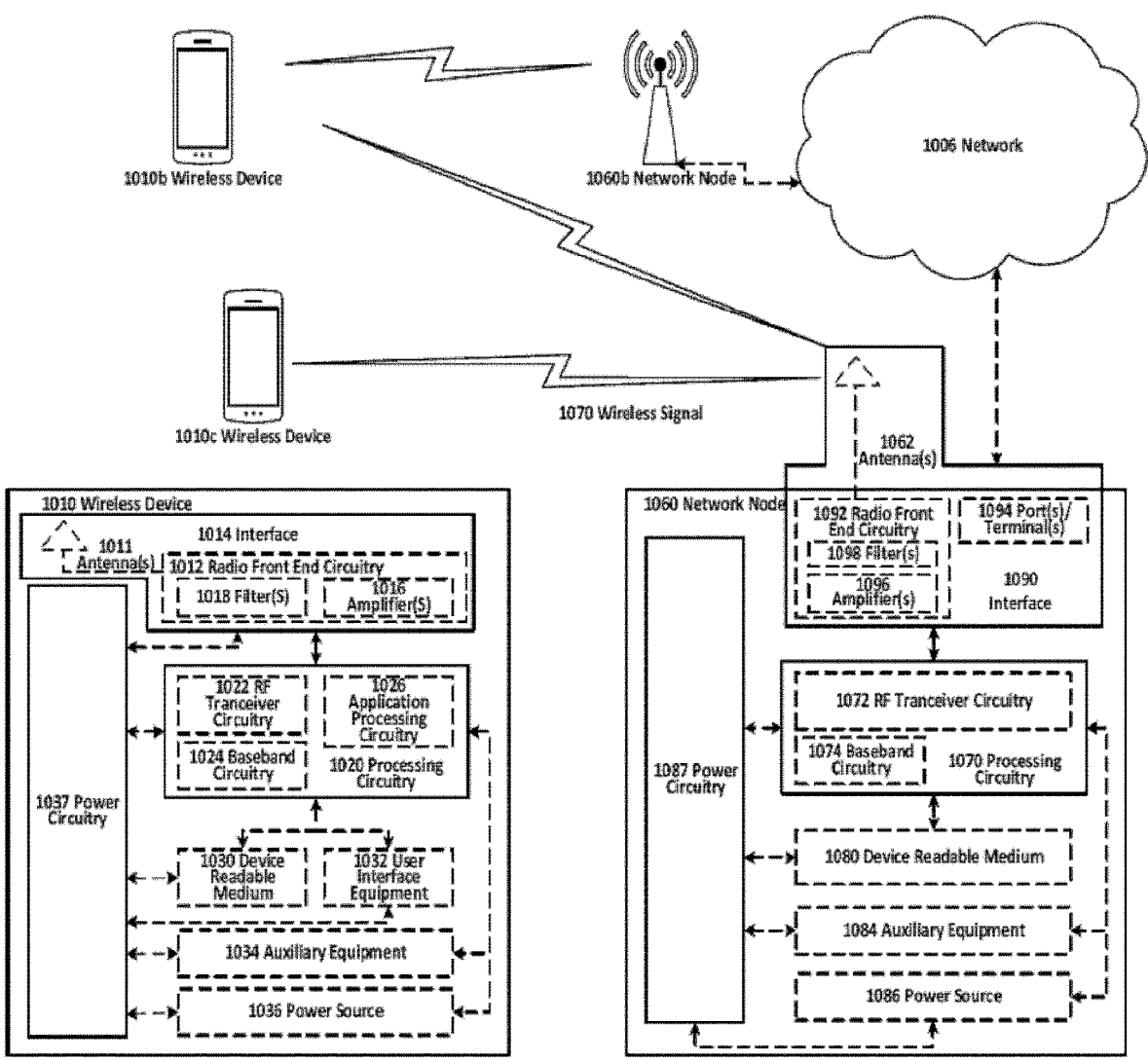
FIG. 11 is a schematic showing a wireless network in accordance with some embodiments.

FIG. 11 is a schematic showing a wireless network in accordance with some embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 1006, network nodes 1060 (corresponding to network side node) and 1060*b*, and WDs (corresponding to terminal device) 1010, 1010*b*, and 1010*c*. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 11 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

FIG. 10 is a schematic showing a user equipment in accordance with some embodiments.

Figure 12:
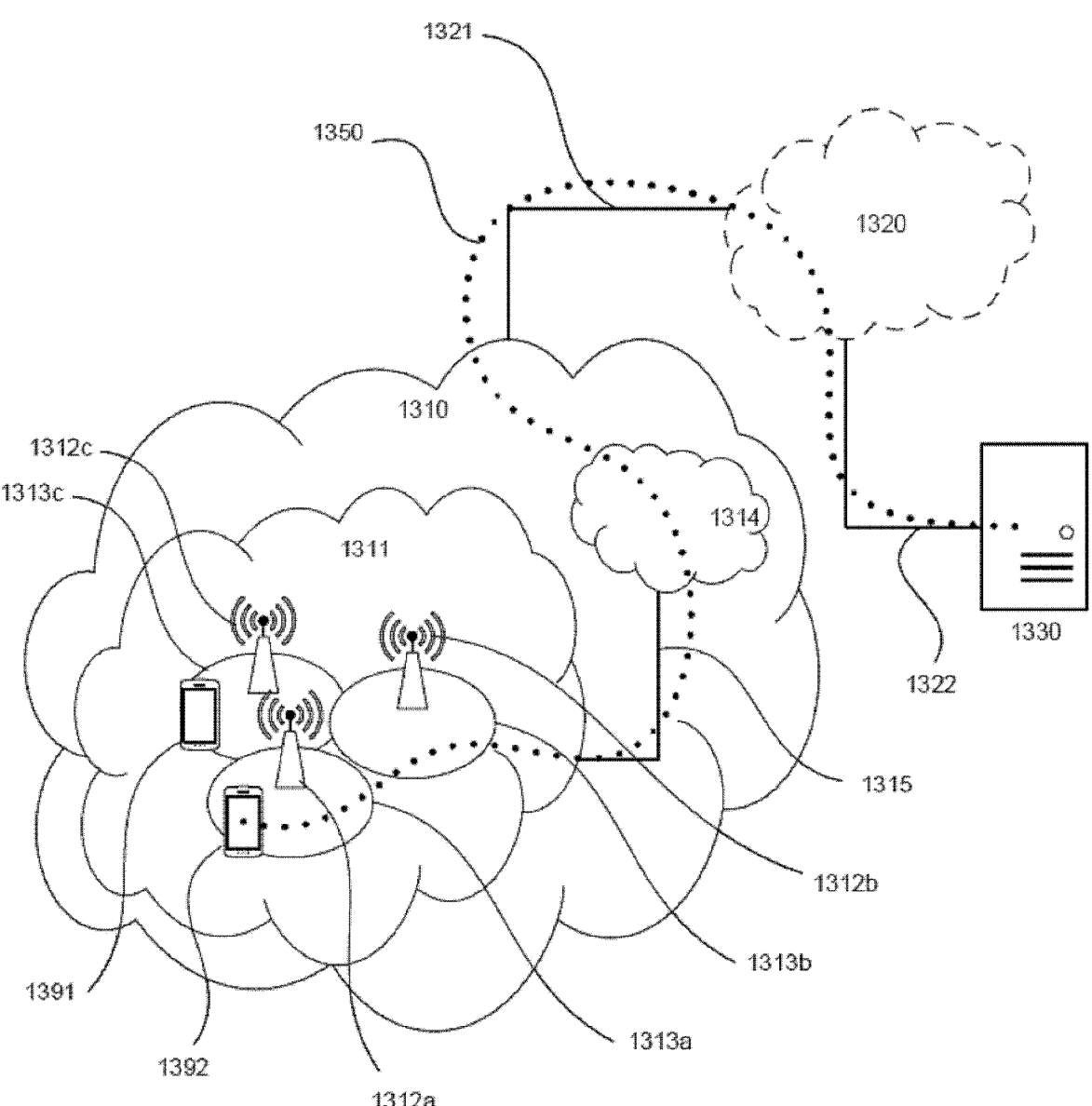
FIG. 12 is a schematic showing a telecommunication network connected via an intermediate network to a host computer in accordance with some embodiments.

FIG. 12 is a schematic showing a telecommunication network connected via an intermediate network to a host computer in accordance with some embodiments.

With reference to FIG. 12, in accordance with an embodiment, a communication system includes telecommunication network 1310, such as a 3GPP-type cellular network, which comprises access network 1311, such as a radio access network, and core network 1314. Access network 1311 comprises a plurality of base stations 1312*a*, 1312*b*, 1312*c*, such as NBs, eNBs, gNBs or other types of wireless access points, each defining a corresponding coverage area 1313*a*, 1313*b*, 1313*c*. Each base station 1312*a*, 1312*b*, 1312*c* is connectable to core network 1314 over a wired or wireless connection 1315. A first UE 1391 located in coverage area 1313*c* is configured to wirelessly connect to, or be paged by, the corresponding base station 1312*c*. A second UE 1392 in coverage area 1313*a* is wirelessly connectable to the corresponding base station 1312*a*. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 12 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signalling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 13:
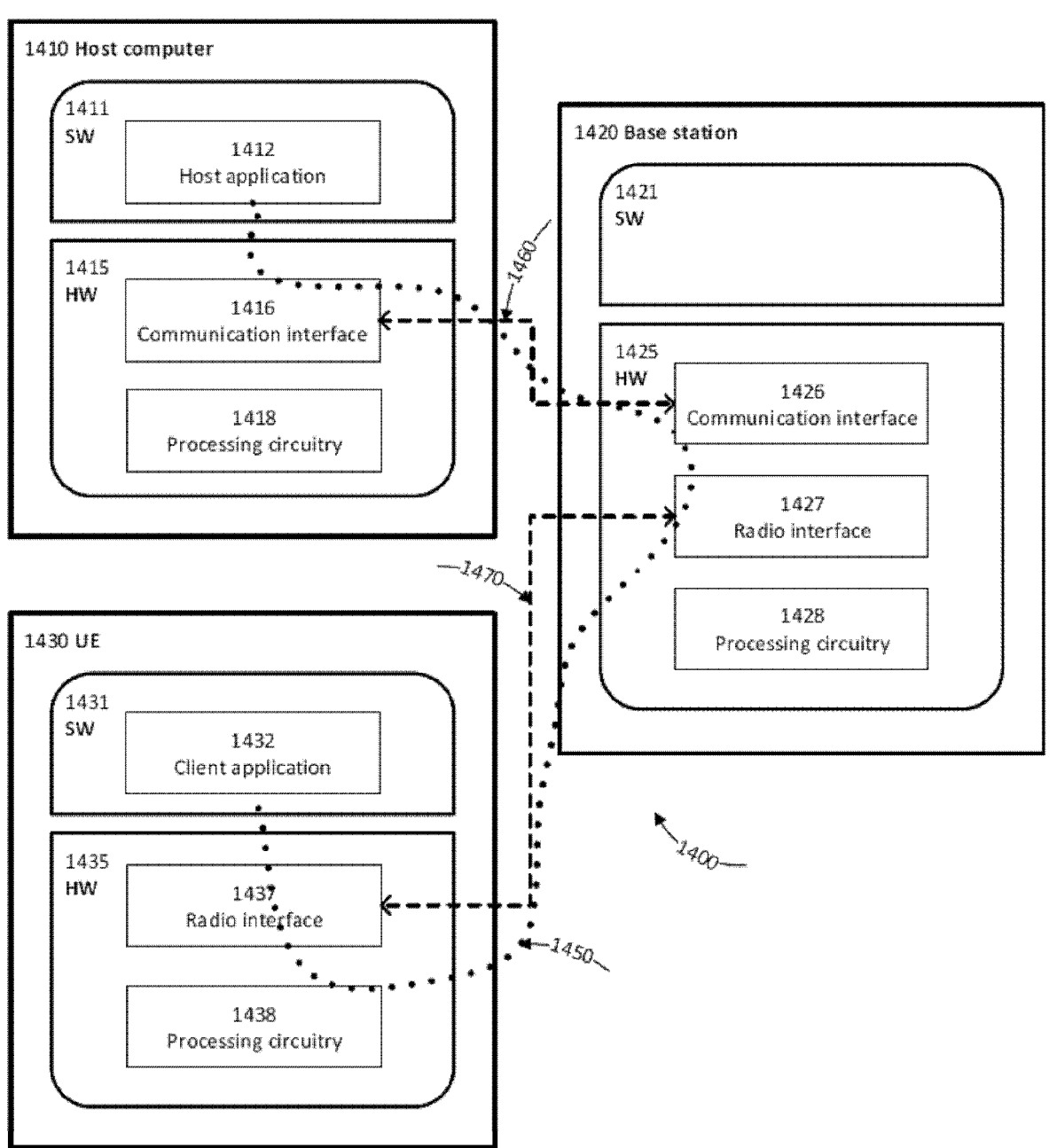
FIG. 13 is a schematic showing a host computer commu-nicating via a base station with a user equipment over a partially wireless connection in accordance with some embodiments.

FIG. 13 is a schematic showing a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 13. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 13) served by base station 1420. Communication interface 1426 may be configured to facilitate connection 1460 to host computer 1410. Connection 1460 may be direct or it may pass through a core network (not shown in FIG. 13) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 13 may be similar or identical to host computer 1330, one of base stations 1312*a*, 1312*b*, 1312*c* and one of UEs 1391, 1392 of FIG. 12, respectively. This is to say, the inner workings of these entities may be as shown in FIG. 13 and independently, the surrounding network topology may be that of FIG. 12.

In FIG. 13, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, and power consumption for a reactivation of the network connection, and thereby provide benefits, such as reduced user waiting time, enhanced rate control.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signalling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 14:
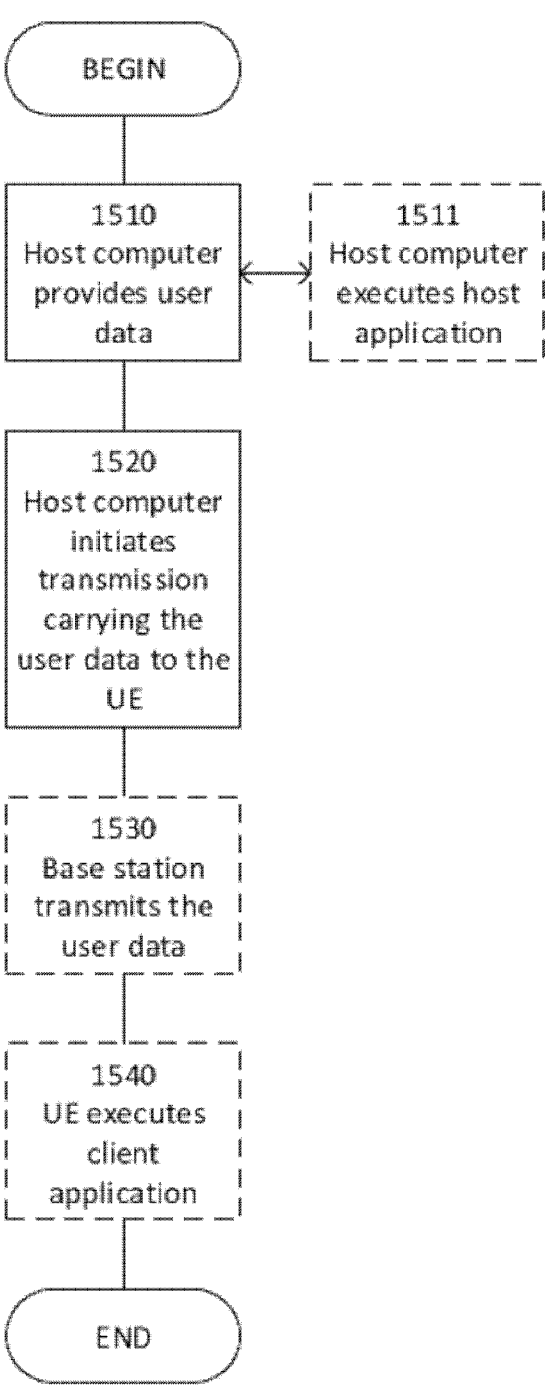
FIG. 14 is a schematic showing methods implemented in a communication system including a host computer, a base station and a user equipment in accordance with some embodiments.

FIG. 14 is a schematic showing methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 15:
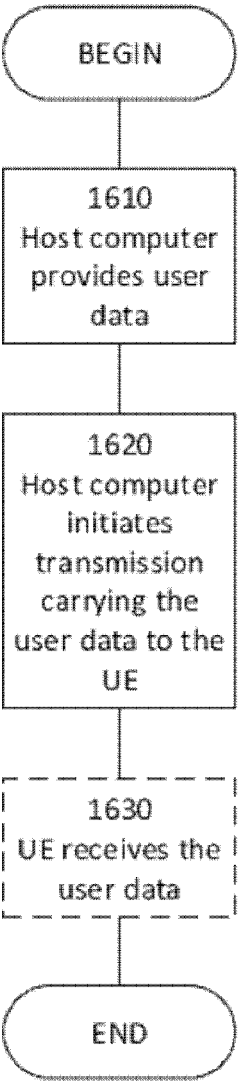
FIG. 15 is a schematic showing methods implemented in a communication system including a host computer, a base station and a user equipment in accordance with some embodiments.

FIG. 15 is a schematic showing methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 16:
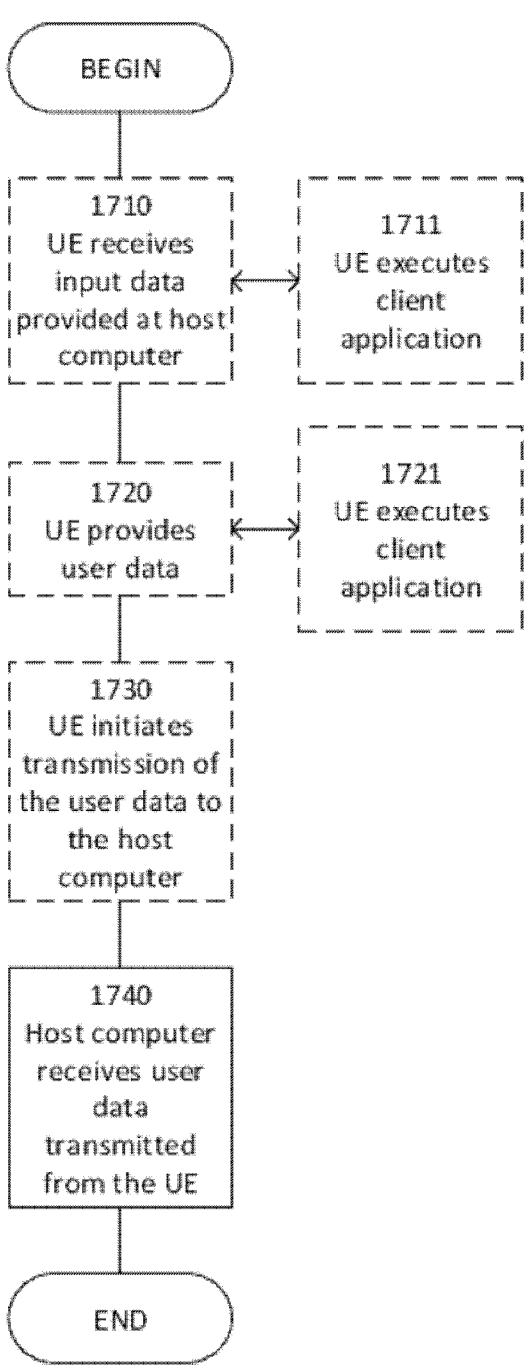
FIG. 16 is a schematic showing methods implemented in a communication system including a host computer, a base station and a user equipment in accordance with some embodiments.

FIG. 16 is a schematic showing methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 17:
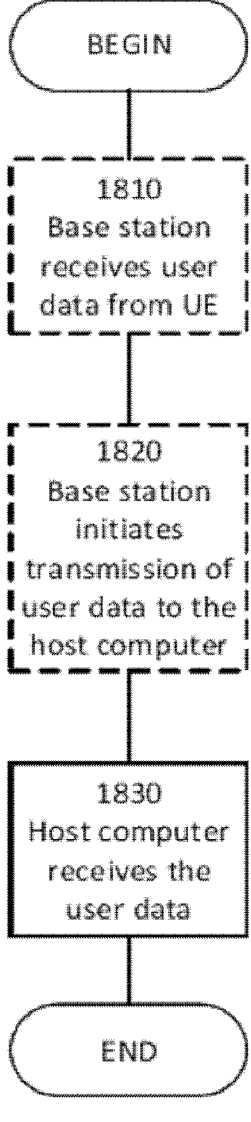
FIG. 17 is a schematic showing methods implemented in a communication system including a host computer, a base station and a user equipment in accordance with some embodiments.

FIG. 17 is a schematic showing methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method implemented at a network node, the method comprising:

updating an initial target received power based on a number of antennas to be used, wherein the initial target received power is updated according to according to:

$$P_0 = P_0^{base} - 10 * \log\left(\frac{N_{ant}}{2}\right)$$

where $P_0$ is an updated initial target received power, $$P_0^{base}$$

is the initial target received power, and $N_{ant}$ is the number of antennas to be used;

transmitting the updated initial received target power to a terminal device;

obtaining channel estimation information of the terminal device;

determining an uplink power value according to the channel estimation information and the number of antennas to be used;

transmitting the uplink power value to the terminal device periodically.

2. The method of claim 1, wherein obtaining the channel estimation information of the terminal device comprises obtaining the channel estimation information of the terminal device via an uplink reference signal, wherein the uplink reference signal comprises a sounding reference signal (SRS).

3. The method of claim 1, wherein the number of antennas to be used is configured in system information.

4. The method of claim 1, wherein determining uplink power value according to the channel estimation information and the number of antennas to be used comprises:

determining path loss information, interference information, and noise evaluation information according to the channel estimation information; and determining the uplink power value according to path loss information, interference information, noise evaluation information, and the number of antennas to be used.

5. The method of claim 4, wherein determining the uplink power value further comprises determining interference level filtering according to:

$$P_{ipn}^{filtered} = (1 - \alpha) * P_{ipn}^{filtered} + \alpha * P_{ipn}$$

where $P_{ipn}$ is an instantaneous power of interference plus noise value, $$P_{ipn}^{filtered}$$

is a filtered result, and $\alpha$ is a filtering factor.

6. The method of claim 5, wherein determining the uplink power value further comprises determining a target received power according to:

$$P_{rx}^{Tgt} = SINR_{UL}^{Mod} + P_{ipn}^{filtered}$$

where $$P_{rx}^{Tgt}$$

is the target received power and $$SINR_{UL}^{Mod}$$

is an uplink (UL) target signal to noise ratio determined according to a Physical Uplink Shared Channel (PUSCH) received power and a modulation mode.

7. The method of claim 6, wherein the modulation mode comprises 256QAM, 64QAM, 16QAM, or QPSK.

8. The method of claim 1, wherein transmitting the uplink power value to the terminal device comprises transmitting the uplink power value to the terminal device via system block information (SIB).

9. The method of claim 8, wherein a period for transmitting the uplink power value is N times a period of the SIB, N is an integer greater than or equal to 1.

10. The method of claim 9, wherein N is determined according to interference level.

11. A method implemented at a terminal device, the method comprising:

receiving, from a network node, an updated initial target received power based on a number of antennas to be used, wherein the initial target received power is updated according to:

$$P_0 = P_0^{base} - 10 * \log\left(\frac{N_{ant}}{2}\right)$$

where $P_0$ is an updated initial target received power, $$P_0^{base}$$

is the initial target received power, and Non is the number of antennas to be used;

determining a preamble transmission power based on the updated initial target received power and a pathloss estimation result;

receiving an uplink power value sent from the network node periodically; and adjusting transmitting power according to the uplink power value;

wherein the uplink power value is determined according to channel estimation information and the number of antennas to be used.

12. The method of claim 11, wherein the method further comprises transmitting an uplink reference signal for channel estimation, before receiving the uplink power value sent from the network node, wherein the uplink reference signal comprises a sounding reference signal (SRS).

13. The method of claim 11, wherein the number of antennas to be used is configured in system information.

14. The method of claim 11, wherein path loss information, interference information, and noise evaluation information is determined according to the channel estimation information; and the uplink power value is determined according to path loss information, interference information, noise evaluation information, and the number of antennas to be used.

15. The method of claim 11, wherein receiving the uplink power value sent from the network node comprises: receiving the uplink power value sent from the network node via system block information (SIB).

16. The method of claim 15, wherein a period for receiving the uplink power value is N times a period of the SIB, N is an integer greater than or equal to 1.

17. The method of claim 16, wherein N is determined according to interference level.

18. A network node comprising:

a processor; and a memory containing instructions that, when executed by the processor, cause the network node to:

update an initial target received power based on a number of antennas to be used, wherein the initial target received power is updated according to:

$$P_0 = P_0^{base} - 10 * \log\left(\frac{N_{ant}}{2}\right)$$

where $P_0$ is an updated initial target received power, $$P_0^{base}$$

is the initial target received power, and $N_{ant}$ is the number of antennas to be used;

transmit the updated initial received target power to a terminal device;

obtain channel estimation information of the terminal device;

determine an uplink power value according to the channel estimation information and the number of antennas to be used; and transmit the uplink power value to the terminal device periodically.

19. The network node of claim 18, wherein obtaining the channel estimation information of the terminal device comprises obtaining the channel estimation information of the terminal device via an uplink reference signal.

20. The network node of claim 18, wherein the number of antennas to be used is configured in system information.

* * * * *